(12) United States Patent
Bowers et al.

(10) Patent No.: US 7,159,146 B2
(45) Date of Patent: Jan. 2, 2007

(54) ANALYZING SYSTEM ERROR MESSAGES

(75) Inventors: Wayne J. Bowers, Fremont, CA (US); Zenon Fortuna, El Cerrito, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 434 days.

(21) Appl. No.: 10/365,681

(22) Filed: Feb. 12, 2003
(Under 37 CFR 1.47)

(65) Prior Publication Data
US 2003/0237035 A1  Dec. 25, 2003

Related U.S. Application Data

(60) Provisional application No. 60/380,412, filed on May 14, 2002.

(51) Int. Cl.
*G06F 11/00* (2006.01)

(52) U.S. Cl. ............................................. 714/37
(58) Field of Classification Search ............ 714/37, 714/46, 48, 57
See application file for complete search history.

(56) References Cited

U.S. PATENT DOCUMENTS

| | | | |
|---|---|---|---|
| 4,633,467 A * | 12/1986 | Abel et al. ............... | 714/45 |
| 5,121,475 A | 6/1992 | Child | |
| 5,237,677 A * | 8/1993 | Hirosawa et al. ........... | 714/57 |
| 5,790,779 A * | 8/1998 | Ben-Natan et al. ......... | 714/39 |
| 5,812,759 A * | 9/1998 | Brooks ..................... | 714/57 |
| 5,845,120 A | 12/1998 | Reddy | |
| 5,892,898 A | 4/1999 | Fujii | |
| 5,909,215 A | 6/1999 | Berstis | |
| 6,006,016 A * | 12/1999 | Faigon et al. ............ | 714/48 |
| 6,208,955 B1 * | 3/2001 | Provan et al. ............ | 703/20 |
| 6,226,375 B1 | 5/2001 | Shaffer | |
| 6,348,875 B1 | 2/2002 | Odinak | |
| 2002/0138782 A1 * | 9/2002 | Durrant et al. ........... | 714/2 |
| 2002/0138791 A1 * | 9/2002 | Durrant et al. ........... | 714/43 |
| 2004/0078695 A1 | 4/2004 | Bowers | |
| 2004/0080427 A1 | 4/2004 | Odinak | |
| 2005/0283675 A1 | 12/2005 | Krebs | |

* cited by examiner

*Primary Examiner*—Nadeem Iqbal
(74) *Attorney, Agent, or Firm*—Meyertons Hood Kivlin Kowert & Goetzel, P.C.; B. Noël Kivlin

(57) ABSTRACT

The present invention provides a method and apparatus for analyzing system error messages. The method includes accessing a report generated in response to an error. The method further includes accessing at least one predetermined error group and determining a probability that the error is associated with the predetermined error group.

32 Claims, 10 Drawing Sheets

ANALYZING SYSTEM ERROR MESSAGES

This application claims the benefit of U.S. Provisional Application No. 60/380,412 entitled "ANALYZING SYSTEM ERROR MESSAGES", filed May 14, 2002.

BACKGROUND OF THE INVENTION

1. Field of the Invention

This invention relates generally to a processor-based system, and, more particularly, to analyzing error messages in a processor-based system.

2. Description of the Related Art

Businesses may use processor-based systems to perform a multiplicity of tasks. These tasks may include, but are not limited to, developing new software, maintaining databases of information related to operations and management, and hosting a web server that may facilitate communications with customers. To handle such a wide range of tasks, businesses may employ a processor-based system in which some or all of the processors may operate in a networked environment.

Processor-based systems are, however, prone to errors that may compromise the operation of the system. For example, a software package running on a processor may request access to a memory location that may already have been allocated to another software package. Allowing the first program to access the memory location could corrupt the contents of the memory location and cause the second program to fail, so the system may deny the first program access and return a system error message. The first program may then fail, perhaps disrupting the operation of the processor and/or the network. Similarly, disconnected power cables, pulled connection wires, and malfunctioning hardware may also disrupt operation of the system.

An error that interferes with or otherwise adversely affects the operation of the system may limit the ability of the business to perform crucial tasks and may place the business at a competitive disadvantage. For example, if a customer cannot reach the business' web site, they may patronize a different business. The competitive disadvantage may increase the longer the system remains disrupted. The error may be one of a group of errors that may be amenable to similar solutions. By identifying the similar group, a system administrator or other user may be able to reduce the time the system may be disrupted by the error.

However, it may be difficult for the system administrator to identify the similar group. For example, the system may comprise dozens of individual processors and each processor may be running one or more pieces of software, including portions of an operating system. The system may further comprise a variety of storage devices like disk drives and input/output (I/O) devices such as printers and scanners. Each of the components of the system may produce error messages that may have different formats. Thus, the complexity of the system may be reflected in a bewildering variety of error messages that may be produced by components of the system. Finding commonalities between the different messages that may be used to place the error in one of the groups may be difficult for the system administrator.

Even if the error can be placed in one of the groups, finding a solution relevant to the group may also be problematic. Select hardware or software applications may each maintain a separate list of solutions to known errors, but the lists may be incomplete or outdated. And even if a solution to an error exists, the system administrator or technician may be obliged to read through many pages of manuals to find the solution.

SUMMARY OF THE INVENTION

In one aspect of the instant invention, an apparatus is provided for analyzing system error messages. The apparatus includes a bus and a processor coupled to the bus, wherein the processor is adapted to receive a report generated in response to an error, access at least one string in the report and at least one stored string in at least one report stored in a database, determine a probability that the string is substantially the same as the stored string, and associate the report with an error group using the determined probability.

In one aspect of the present invention, a method is provided for analyzing system error messages. The method includes accessing a report generated in response to an error. The method further includes accessing at least one predetermined error group and determining a probability that the error is associated with the predetermined error group.

BRIEF DESCRIPTION OF THE DRAWINGS

The invention may be understood by reference to the following description taken in conjunction with the accompanying drawings, in which like reference numerals identify like elements, and in which.

Figure 1:
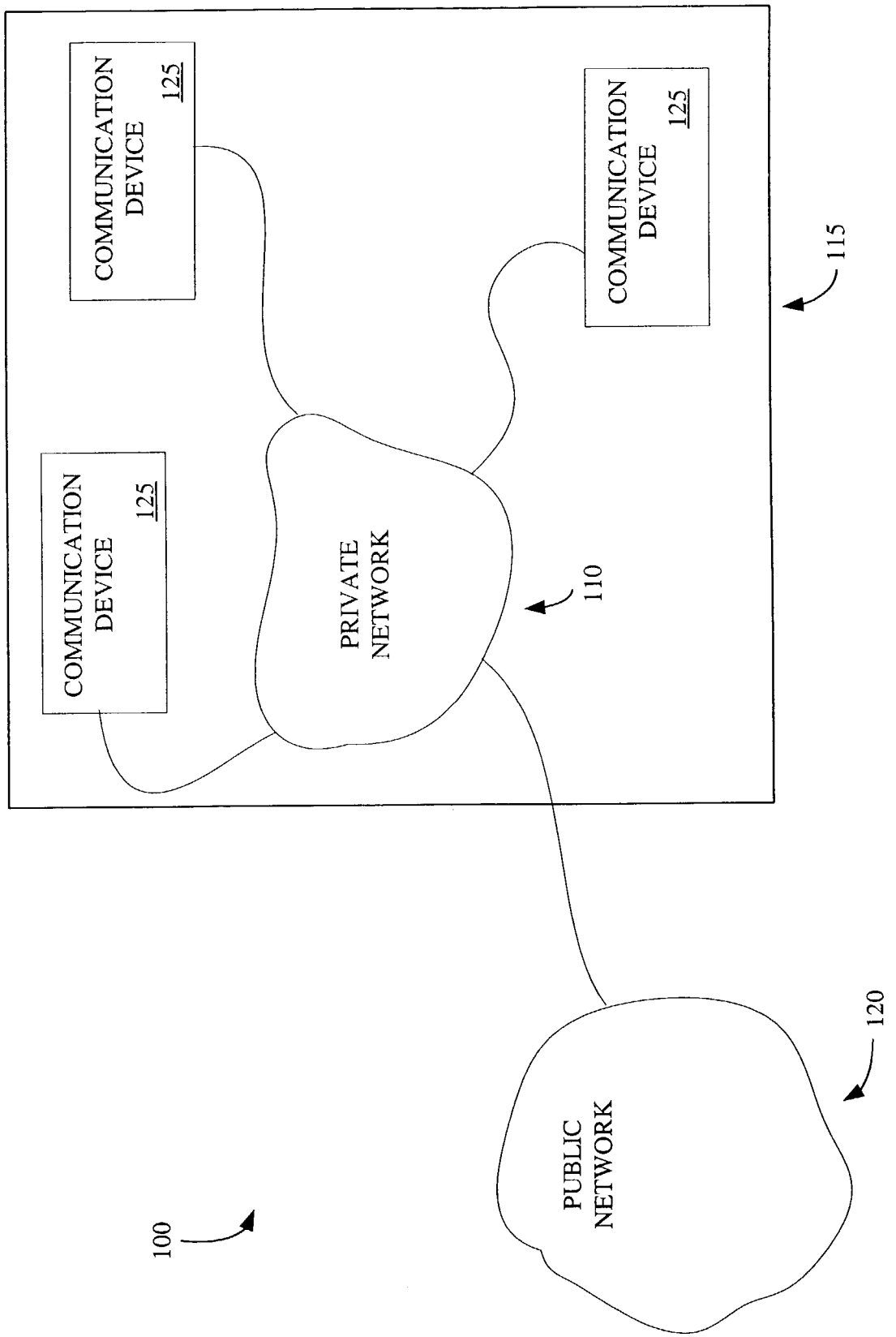
FIG. 1 shows a block diagram of a communications system that includes various nodes or network elements that are capable of communicating with each other, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows a stylized block diagram of an exemplary communications system 100 comprising various nodes or network elements that are capable of communicating with each other. The exemplary network elements and the manner in which they are interconnected are for illustrative purposes only, and are not intended to limit the scope of the invention. A variety of other arrangements and architectures are possible in further embodiments.

The communications system 100 may include a private network 110 that is located in a community 115 coupled to a public network 120 (e.g.; the Internet). A "private network" refers to a network that is protected against unauthorized general public access. A "network" may refer to one or more communications networks, links, channels, or paths, as well as routers or gateways used to pass data between elements through such networks, links, channels, or paths. Although reference is made to "private" and "public" networks in this description, further embodiments may include networks without such designations. For example, a community 115 may refer to nodes or elements coupled through a public network 120 or a combination of private and public networks 110, 120.

The nodes or elements may be coupled by a variety of mechanisms, well known to those of ordinary skill in the art, including both physical electronic connections such as wires and/or cables and wireless connections such as radio-frequency waves. Although not so limited, the data and electronic communications link/connection may also comprise one of a variety of links or interfaces, such as a local area network (LAN), an internet connection, a telephone line connection, a satellite connection, a global positioning system (GPS) connection, a cellular connection, a laser wave generator system, any combination thereof, or equivalent data communications links.

In one embodiment, the communication protocol used in the various networks 110, 120 may be the Internet Protocol (IP), as described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Packet-based networks such as IP networks may communicate with packets, datagrams, or other units of data that are sent over the networks. Unlike circuit-switched networks, which provide a dedicated end-to-end connection or physical path for the duration of a call session, a packet-based network is one in which the same path may be shared by several network elements.

The communications system 100 may comprise a plurality of communication devices 125 for communicating with the network 110, 120. The communications devices 125 may comprise computers, Internet devices, or any other electronic device capable of communicating with the networks 110, 120. Further examples of electronic devices may comprise telephones, fax machines, televisions, or appliances with network interface units to enable communications over the private network 110 and/or the public network 120.

Figure 2:
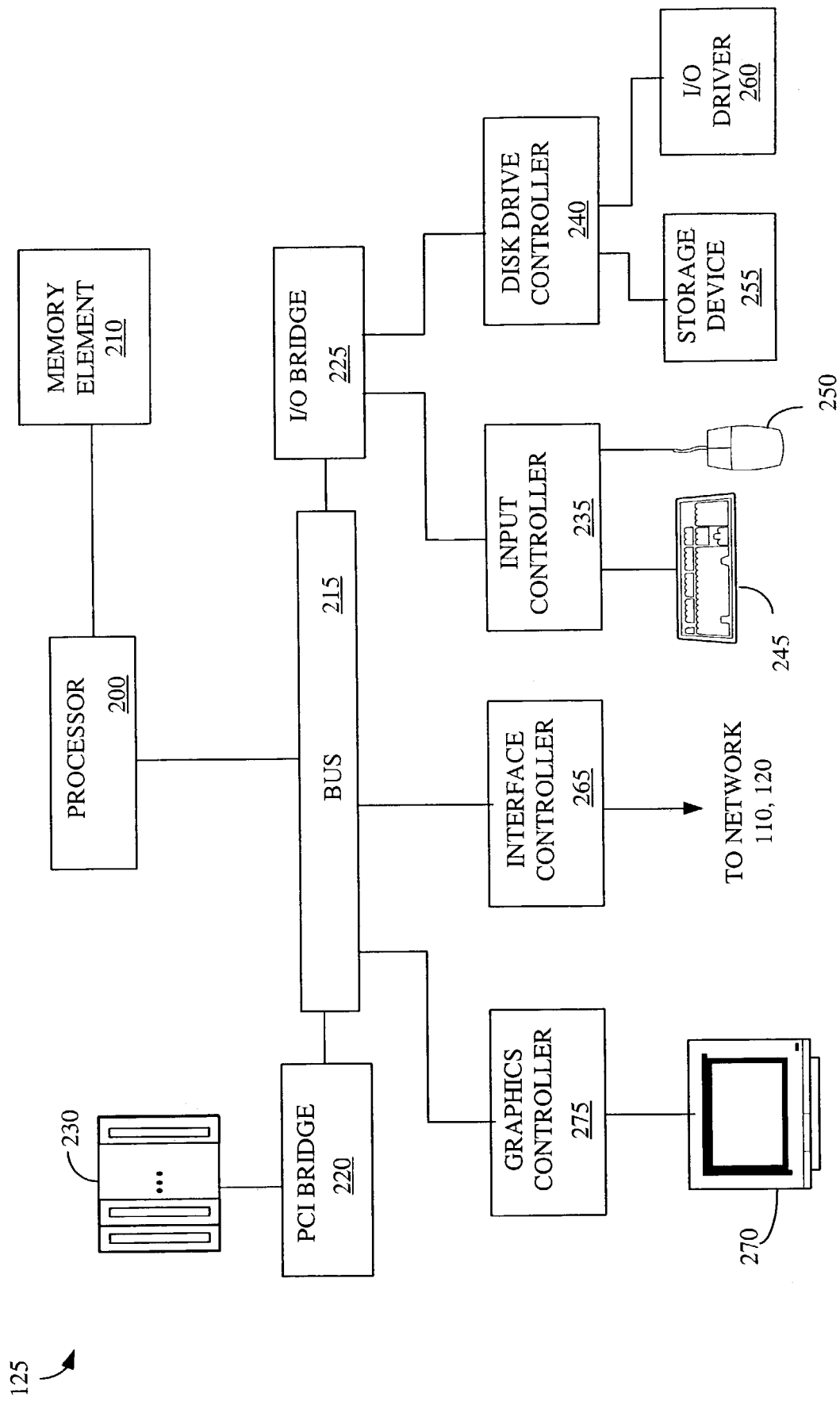
FIG. 2 shows a block diagram of one embodiment of a communications device that may be employed in the communications network shown in FIG. 1.

FIG. 2 shows a block diagram of one embodiment of the communication device 125. For example, the communication device 125 may be a workstation such as the Sun Blade® Workstation. The communication device 125 may comprise at least one processor 200 adapted to perform one or more tasks or to spawn one or more processes. Although not so limited, in one embodiment, the processor 200 may be a 500-MHz UltraSPARC-IIe® processor. The processor 200 may be coupled to at least one memory element 210 adapted to store information. For example, the memory element 210 may comprise 2-gigabytes of error-correcting synchronous dynamic random access memory (SDRAM) coupled to the processor 200 via one or more unbuffered SDRAM dual in-line memory module (DIMM) error-correcting slots (not shown).

In one embodiment, the memory element 210 may be adapted to store a variety of different forms of information including, but not limited to, one or more of a variety of software programs, data produced by the software and hardware, and data provided by the private and public networks 110, 120. Although not so limited, the one or more software programs stored in the memory element 210 may include software applications (e.g. database programs, word processors, and the like) and at least a portion of an operating system (e.g. the Solaris® operating system). The code for the software programs stored in the memory element 210 may, in one embodiment, comprise one or more instructions that may be used by the processor 200 to perform various tasks or spawn various processes.

The processor 200 may be coupled to a bus 215 that may transmit and receive signals between the processor 200 and any of a variety of devices that may also be coupled to the bus 215. For example, in one embodiment, the bus 215 may be a 32-bit-wide, 33-MHz peripheral component interconnect (PCI) bus. A variety of devices may be coupled to the bus 215 via one or more bridges, which may include a PCI bridge 220 and an I/O bridge 225. It should, however, be appreciated that, in alternative embodiments, the number and/or type of bridges 220, 225 may change without departing from the spirit and scope of the present invention. In one embodiment, the PCI bridge 220 may be coupled to one or more PCI slots 230 that may be adapted to receive one or more PCI cards, such as Ethernet cards, token ring cards, video and audio input, SCSI adapters, and the like.

The I/O bridge 225 may, in one embodiment, be coupled to one or more controllers, such as an input controller 235 and a disk drive controller 240. The input controller 235 may control the operation of such devices as a keyboard 245, a mouse 250, and the like. The disk drive controller 240 may similarly control the operation of a storage device 255 and an I/O driver 260 such as a tape drive, a diskette, a compact disk drive, and the like. It should, however, be appreciated that, in alternative embodiments, the number and/or type of controllers 235, 240 that may be coupled to the I/O bridge 225 may change without departing from the scope of the present invention. For example, the I/O bridge 225 may also be coupled to audio devices, diskette drives, digital video disk drives, parallel ports, serial ports, a smart card, and the like.

An interface controller 265 may be coupled to the bus 215. In one embodiment, the interface controller 265 may be adapted to receive and/or transmit packets, datagrams, or other units of data over the private or public networks 110, 120, in accordance with network communication protocols such as the Internet Protocol (IP), other versions of IP like IPv6, or other packet-based standards as described above. Although not so limited, in alternative embodiments, the interface controller 265 may also be coupled to one or more IEEE 1394 buses, FireWire ports, universal serial bus ports, programmable read-only-memory ports, and/or 10/100Base-T Ethernet ports.

One or more output devices such as a monitor 270 may be coupled to the bus 215 via a graphics controller 275. The monitor 270 may be used to display information provided by the processor 200. For example, the monitor 270 may display documents, 2-D images, or 3D renderings.

For clarity and ease of illustration, only selected functional blocks of the communication device 125 are illustrated in FIG. 2, although those skilled in the art will appreciate that the communication device 125 may comprise additional or fewer functional blocks. Additionally, it should be appreciated that FIG. 2 illustrates one possible configuration of the communication device 125 and that other configurations comprising interconnections may also be possible without deviating from the scope of one or more embodiments of the present invention. For example, in an alternative embodiment, the communication device 125 may include additional or fewer bridges 220, 225. As an additional example, in an alternative embodiment, the interface controller 265 may be coupled to the processor 200 directly. Similarly, other configurations may be possible.

In the course of the normal operations of the communication device 125 described above, hardware and software components of the communication device 125 may operate in an incorrect or undesirable fashion and produce one or more errors. As utilized hereinafter, the term "error" refers to the incorrect or undesirable behavior of hardware devices or software applications executing in the system 100. For example, errors may comprise hardware errors such as a malfunctioning communication device 125 or they may comprise software errors such as an invalid request for access to a memory location. An error may cause the software, the hardware, or the system 100 to become substantially unable to continue performing desired tasks, a condition that will be referred to hereinafter as a "crash." Errors may also comprise "faults," which generally refer to errors caused by a physical sub-system of the system 100. For example, when referring to errors caused by malfunctions of the memory element 210, central processing unit (CPU), or other hardware, it is customary to refer to "memory faults," "CPU faults," and "hardware faults," respectively. Faults may also be caused by incorrect or undesirable behavior of software applications.

The one or more hardware or software components (or combinations thereof) of the communication device 125 may generate a variety of data in response to errors. Although not so limited, the data may include error messages, log files, core dumps, and portions of the data that may be stored in memory elements 210 on the communication device 125. The data may, in one embodiment, be periodically removed or updated. For example, log files may be updated and/or removed when the communication device 125 is re-booted after a crash. When an error occurs, the communication device 125 may further be adapted to provide a message to notify one or more components in the communication device 125, and/or other devices that may be coupled to the private or public network 110, 120, that an error has occurred. Such a message will hereinafter be referred to as an "event message." Hereinafter, the error messages, the event messages, the log files, and other data and files that may be provided following an error will be referred to collectively as "diagnostic information."

For example, diagnostic information may be provided by the communication device 125 when a hardware component associated with the I/O driver 260 malfunctions or otherwise operates in an undesirable manner. For a more specific example, the processor 200 may attempt to access a storage medium through the I/O driver 260. If the communication device 125, however, determines that there is no storage medium associated with the I/O driver 260, the communication device 125 may generate an error message. The error message may be displayed on the monitor 270, instructing the user to take an appropriate action. For example, the user may be instructed to insert the desired storage medium in the I/O driver 260 or to cancel the request. The error message may be written to a log file, which may be stored on the storage device 255.

Diagnostic information may also be generated when software executing on the communication device 125 performs in an unexpected or undesirable manner. For example, a memory access violation may occur when one process attempts to access a memory region that has been reserved by the operating system of the communication device 125 for another process. The memory access violation can cause unexpected or undesirable results to occur in the communication device 125. For example, a memory access violation may interrupt the execution of one or more processes, terminate all executing processes, or even cause the communication device 125 to hang or crash. In response to a memory access violation or other software errors, the communication device 125 may provide an error message that may be written to a log file. In one embodiment, the error message may include a name of the subroutine that caused the error, an indicator of the type or severity of the error, and the addresses of any memory locations that may have been affected by the error. In addition to providing the error message in response to a software error, such as the memory access violation in the illustrated example, the communication device 125 may generate diagnostic information, such as a core dump. It should be noted that software errors may occur at any of a variety of levels in the communication device 125. For example, errors may occur at a device driver level, operating system level, or application level.

Not all errors may generate associated diagnostic information. Nevertheless, a system administrator or technician may be able to determine the cause of the error by analyzing diagnostic information that is not directly associated with the error, but which may be produced by the communication device 125 as a consequence of the error. For example, the communication device 125 may not detect an intermittent problem in a power supply in the storage device 255 and so may not create an error message. The intermittent problem may, however, cause errors in other hardware and/or software components of the communication device 125. The communication device 125 may detect these subsequent errors and generate a plurality of error messages and other diagnostic information that may be stored, if so desired, in the storage device 255.

In one embodiment, diagnostic information associated with the various errors may not be provided in a standardized form, further complicating the task of analyzing error messages. For example, the error messages provided by the communication device 125 in response to an error in a database program may differ from error messages provided in response to an error in an Internet browser. Thus, in one embodiment, a capture reporting system for accessing the diagnostic information, identifying a category of the error, and extracting one or more attributes of the error from the diagnostic information may be provided as discussed in detail below.

The reports created by the capture reporting system may be used to determine the cause of the error and to debug the error. However, determining the cause of the error using the reports may be a time-consuming task for the system administrator. Thus, in accordance with one embodiment of the present invention, the generated reports may be received by a capture analysis system, which may access the diagnostic information contained in the report. The capture analysis system may also access one or more error groups that may be stored in a database and determine a probability that the report is associated with each of the accessed error groups. The system administrator may then associate the report with one of the accessed error groups or create a new error group.

Figure 3A:
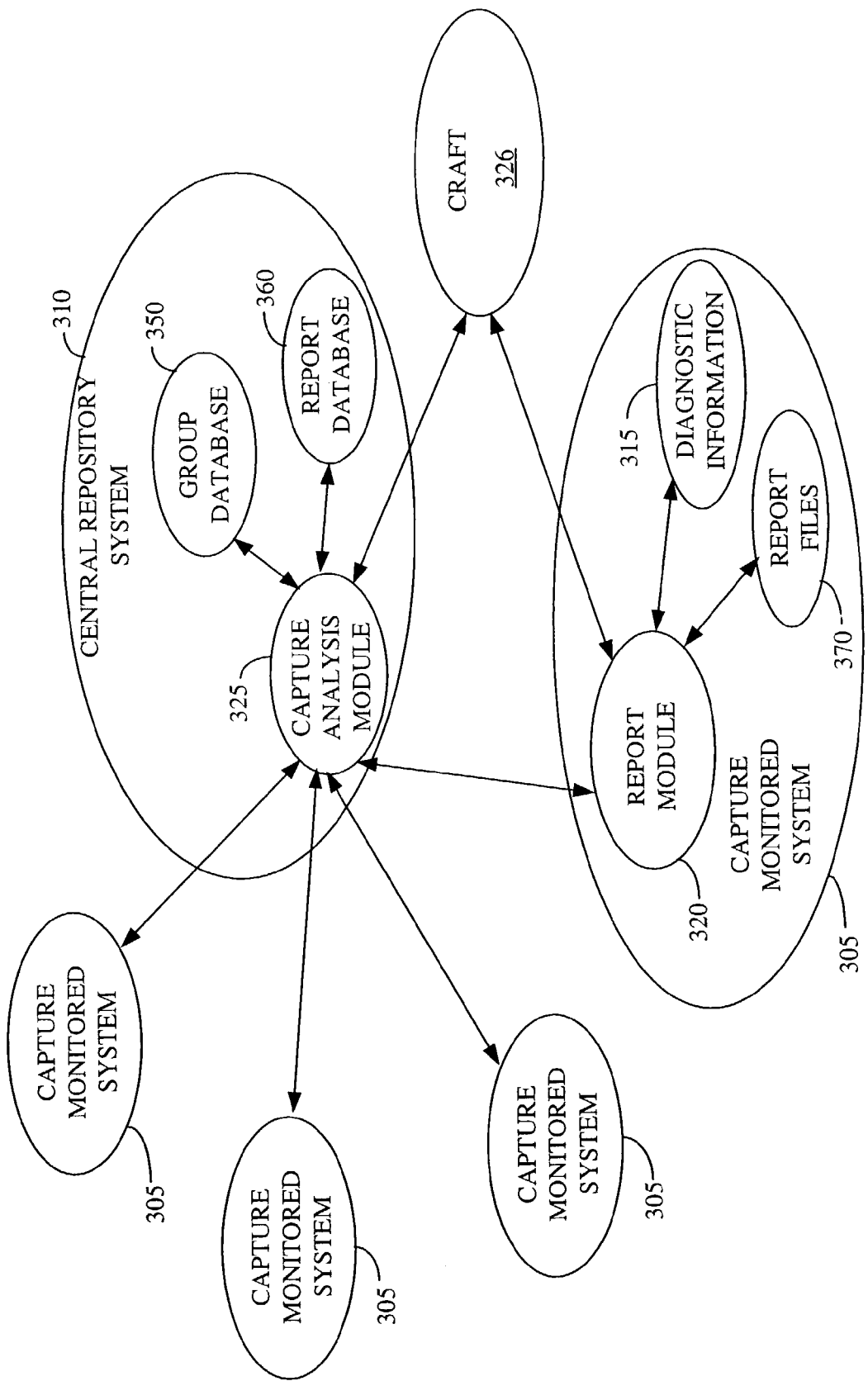
FIGS. 3A–C show exemplary error capture report and central repository systems that may be used in the communications device illustrated in FIG. 2 and the communications network illustrated in FIG. 1, in accordance with one embodiment of the present invention.

Referring now to FIG. 3A, a stylized diagram of an exemplary error capture and analysis system 300 that may be used to gather and analyze diagnostic information is shown. error capture and analysis system 300 may, in one embodiment, comprise one or more capture monitored systems 305 and a central repository system 310. The systems 305, 310 may be formed of one or more communications devices 125, which may be coupled by a network 110, 120. The systems 305, 310 and the manner in which they are interconnected in FIG. 3A are for illustrative purposes only, and thus the systems 305, 310 may, in alternative embodiments, be interconnected in any other desirable manner. For example, the central repository system 310 may be coupled to the one or more capture monitored systems 305 by a private or public network 110, 120, as described above. However, it should also be appreciated that the capture monitored system 305 and the central repository system 310 may, in alternative embodiments, be implemented in a single communication device 125.

In one embodiment, the capture monitored system 305 may have one or more software components, such as parts of an operating system, the execution of which may generate errors. Hardware components may also generate errors in the capture monitored system 305. To reduce the number of errors in the shipped versions of the one or more software components and/or hardware components in the capture monitored system 305, collectively referred to hereinafter as the "product under development," developers may wish to evaluate or test the product under development before shipping. After the capture monitored system 305 has been installed, system administrators may wish to debug errors in the capture monitored system 305 to evaluate or further test the product under development.

The software and/or hardware errors may cause the capture monitored system 305 to provide associated diagnostic information 315 that may be stored on the capture monitored system 305, as described above. Evaluating and testing the product under development may therefore, in accordance with one embodiment of the present invention, include accessing and analyzing diagnostic information 315 that may be stored on the capture monitored system 305. To this extent, the capture monitored system 305 may include a report module 320 and the central repository system 310 may include a capture analysis module 325 for accessing and analyzing the diagnostic information 315. The modules 320, 325 may be implemented in hardware, software, or a combination thereof.

The report module 320 may be used by the capture monitored system 305 to spawn one or more report daemon processes. Hereinafter, the term "report daemon process" refers to a process spawned by the report module 320 that runs as a silent background process and may or may not be visible to the user. However, it should be noted that, in alternative embodiments, a non-daemon process may also be utilized. The report daemon process spawned by the report module 320 may detect the occurrence of errors by detecting a triggering event occurring in the capture monitored system 305. As used hereinafter, the term "triggering event" refers to an event or sequence of events that may be a consequence of, or related to, an error. For example, the triggering event may comprise an event message, which may be provided by the capture monitored system 305 in response to an error.

The report daemon process may also detect the occurrence of errors by detecting a triggering event comprising a sequence of one or more non-event messages. Non-event messages may be provided in response to the error produced by one or more components of the capture monitored system 305, such as the operating system, other software applications, or hardware components. The capture monitored system 305 may store the non-event messages and may not take any further action in response to the non-event messages. The report module 320 may, in one embodiment, periodically access the diagnostic information 315 and detect sequences of non-event messages that may have been stored elsewhere on the capture monitored system 305. In one embodiment, the report module 320 may use predefined sequences of non-event messages as triggering events. The report module 320 may, in alternative embodiments, allow users to define one or more sequences of non-event messages as triggering events.

In response to a triggering event, and in accordance with one embodiment of the present invention, the capture analysis module 325 may access and analyze the diagnostic information 315 -associated with the error. To facilitate accessing and analyzing the diagnostic information 315, according to one embodiment of the present invention, the report module 320 and the capture analysis module 325 may use a capture reference attribute function table (CRAFT) 326. In one embodiment, the CRAFT 326 may be integrated in the systems 305, 310, although for the sake of clarity the CRAFT 326 is depicted as a stand-alone entity in FIG. 3A. In alternative embodiments, portions of the CRAFT 326 may be distributed among the one or more capture monitored systems 305, the central repository system 310, and/or other systems (not shown).

Figure 3B:
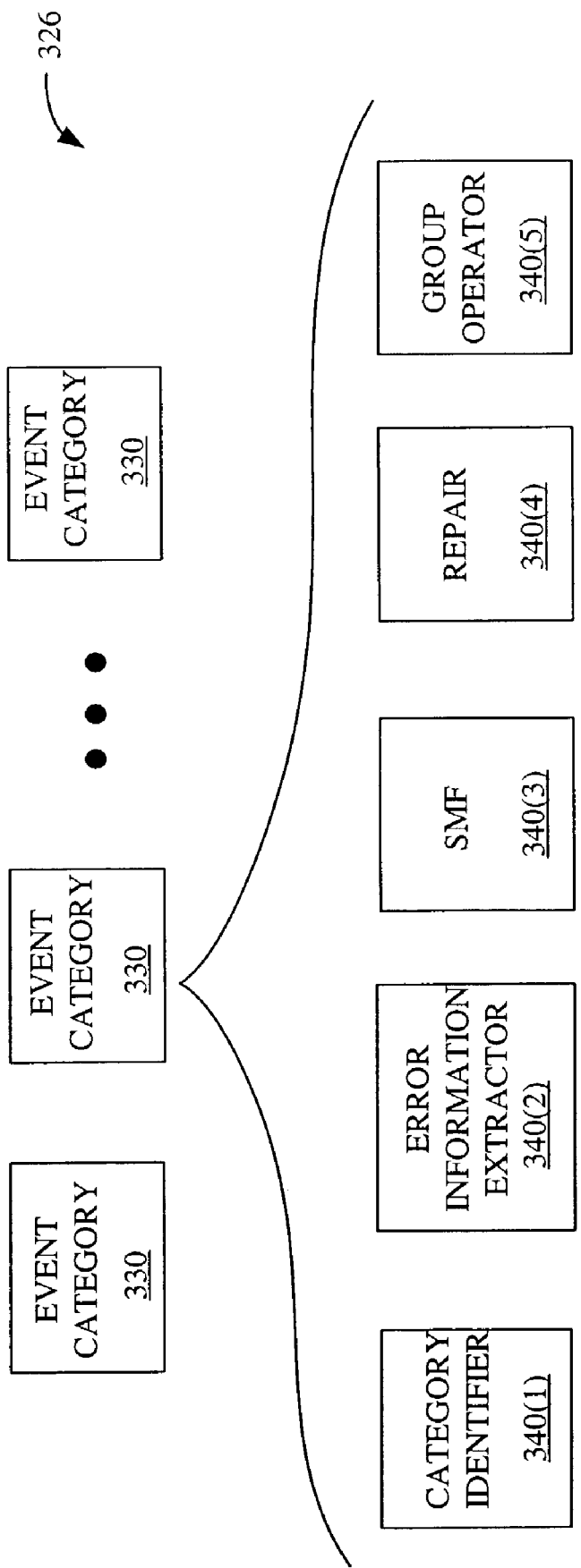

Referring now to FIG. 3B, a database structure that may be used to implement the CRAFT 326 is shown. In one embodiment, entries in the CRAFT 326 may be indexed by an event category 330. Hereinafter, the term "event category" refers to errors that may have a common source, cause, or other common characteristic. For example, the event categories 330 may include, but are not limited to, operating system errors, software application errors, peripheral device errors, networking errors, system hardware errors, and the like. In one embodiment, the event categories 330 may be implemented as a set of category definitions in the object-oriented programming language JAVA. In alternative embodiments, other programming languages such as Perl, C, C++, and the like may be used to implement the event categories 330. The event categories 330 in the CRAFT 326 may be associated with a set of functions 340(1–5). The functions 340(1–5) may perform specific tasks relevant to each event category 330. Although not so limited, the functions 340(1–5) may include a category identifier 340(1), an error information extractor 340(2), a similarity matching function (SMF) 340(3), a repair function 340(4), and a group operator 340(5). In one embodiment, the functions 340(1–5) may be implemented as one or more shell scripts.

The selected functions 340(1–5) in the CRAFT 326 may, in one embodiment, be used by the report module 320 to access diagnostic information 315 associated with an error. For example, the category identifier 340(1) may be used by the report module 320 to verify that an error may be a member of the event category 330. For another example, the report module 320 may use the error information extractor function 340(2) to access the diagnostic information, extract error attributes from the diagnostic information 315, and generate one or more error attribute strings. The one or more error attribute strings may include information derived from the diagnostic information 315. For example, the report module 320 may use the shell scripts that implement the error information extractor 340(2) to extract a "Panic String," a "Host ID," and a "Panic Stack Trace" from the core dump caused by an error and save them as three error attribute strings.

Figure 3C:
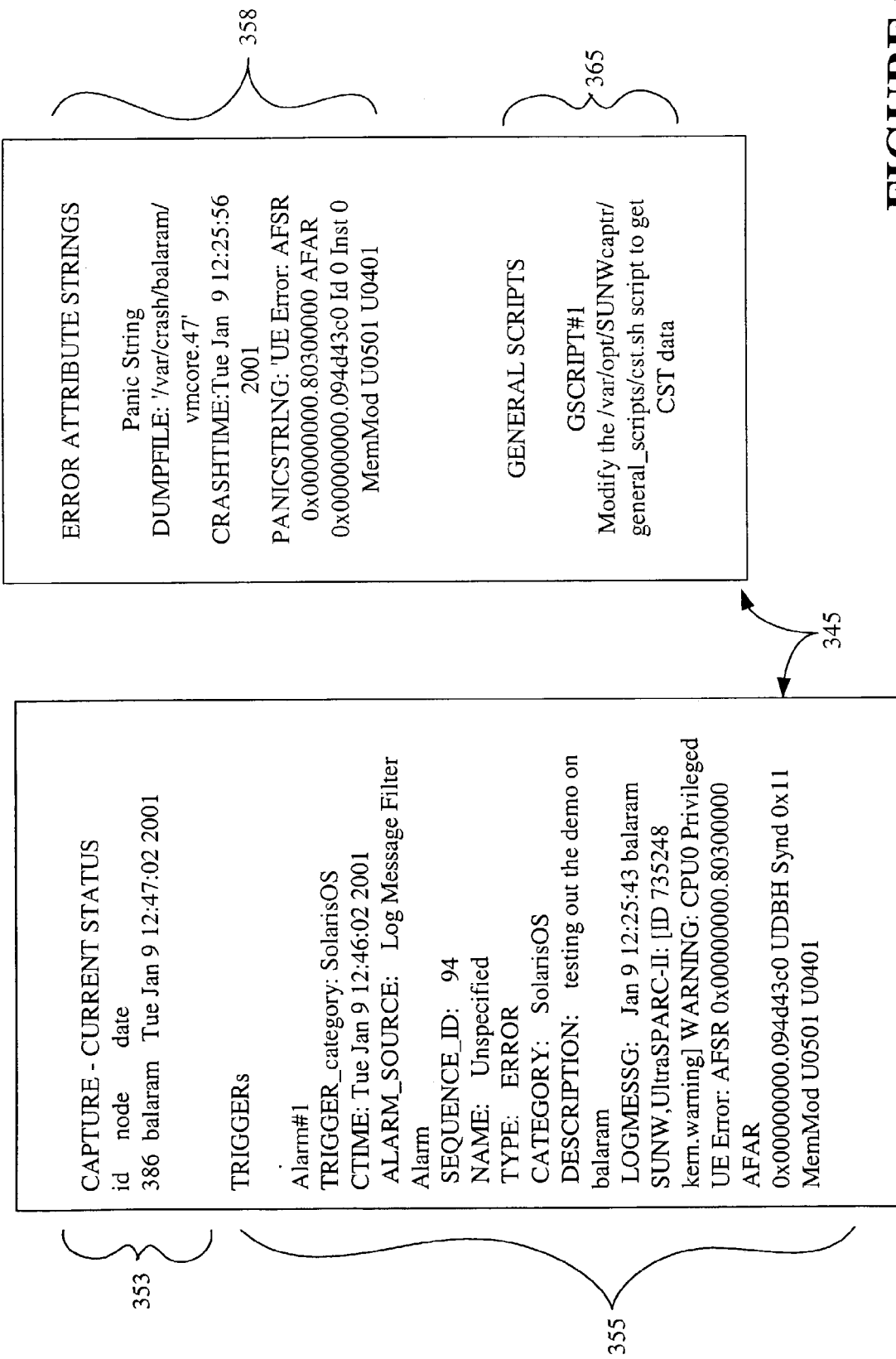

FIG. 3C shows an abridged example of a capture report 345 that may be provided by one embodiment of the report module 320. The selected functions 340(1–5) may create the capture report 345 from the error attribute strings and other portions of the diagnostic information 315. In this example, the capture report 345 includes a header 353 that may include such information as an identification number, "386," the name of the node from which the error was captured, "balaram," and the date of the capture, "Tue Jan 9 12:47:02 2001." The capture report 345 may also include a trigger section 355 that may include portions of the diagnostic information 315 related to the triggering event such as the time of the error, the class of the error, and the like. In this example, the trigger section 355 also includes a category of the trigger and a category of the error ("SolarisOS"), a time when the trigger was detected ("Tue Jan 9 12:46:02 2001"), and a log message associated with the error ("LOGMESSG: Jan 9 12:25:43 balaram . . . ").

The capture report 345 may further include one or more error attribute strings 358 created by the capture report daemon. In this example, the error attribute string 358 includes the location of portions of the diagnostic information 315 used to create the error attribute string 358 ("DUMPFILE: . . . "), a time associated with a system crash ("CRASHTIME: . . . "), and a panic string. A record 365 of any other general scripts that may have been executed in response to the error may be included in the capture report 345. In the example shown in FIG. 3C, the record 365 indicates that GSCRIPT#1 was executed to extract more data from the diagnostic information 315. The report module 320 may store the capture report 345 as one or more report files 370 in the capture monitored system 305, as shown in FIG. 3A.

Figure 4:
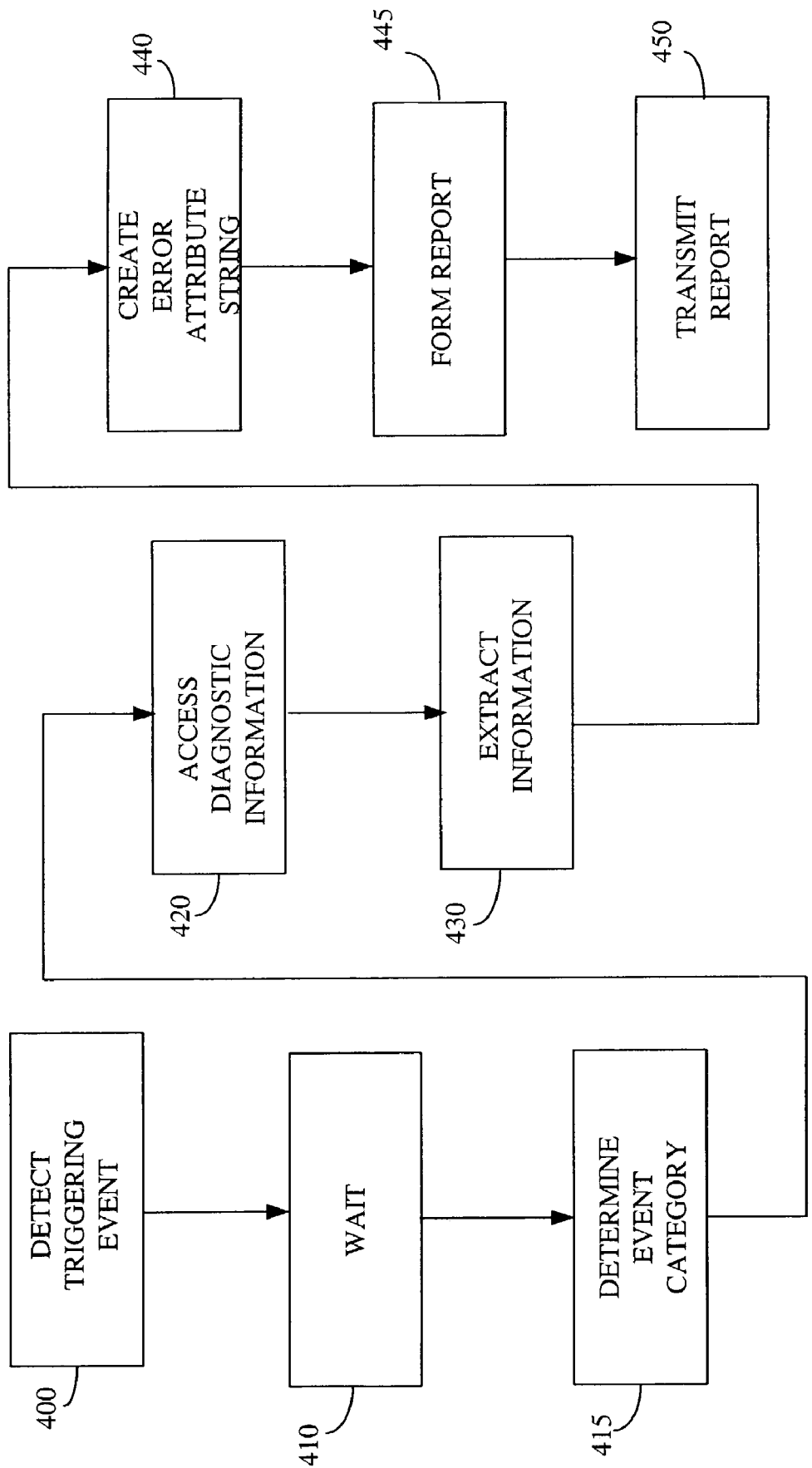
FIG. 4 shows a flow diagram of a method of gathering error messages from the capture report system depicted in FIG. 3, in accordance with one embodiment of the present invention.

FIG. 4 shows a flow diagram that illustrates one method of accessing the diagnostic information 315, identifying the category associated with the error, extracting error attributes, and creating the capture report 345. In one embodiment, the capture monitored system 305 may detect (at 400) a triggering event provided as a consequence of an error occurring in the capture monitored system 305, as described above. The report daemon process may, in one embodiment, wait (at 410) for a predetermined time to allow the error to propagate through the capture monitored system 305, as well as to allow the diagnostic information 315 to be stored in the capture monitored system 305. The capture report daemon may then determine (at 415) the event category 330 of the error by comparing the event message or the sequence of messages to the event categories using the category identifier function 340(1) in the CRAFT 326.

The report daemon process may access (at 420) the diagnostic information 315 that may have been created as a consequence of the error. The report daemon process may then, in one embodiment, use the error information extractor 340(2) to extract (at 430) information from the diagnostic information 315. For example, the report daemon process may execute one or more shell scripts in the CRAFT 326 that may perform one or more error information extraction functions 340(2) that include, but are not limited to, searching the log messages for panic strings, memory addresses, and indications of the severity of the error.

The report daemon process may use the extracted information to create (at 440) one or more error attribute strings. In one embodiment, the error attribute strings may comprise information derived from the error messages that may be stored in the error files. The derived information may, for example, indicate the hardware or software components in which the error occurred, the memory locations affected by the error, and the severity of the error. The error attribute strings 358 may have any one of a variety of formats. For example, the error attribute strings 358 may be formatted in Extensible Markup Language (XML).

The report daemon process may combine the error attribute strings 358 with other relevant data as described above to form (at 445) a report, which the report daemon process may transmit (at 450) to the capture analysis module 325 of the central repository system 310 by any one of a variety of means well known to persons of ordinary skill in the art. For example, the report daemon process may include the report in an email message and send the email message to the capture analysis module 325 of the central repository system 310 over the private or public network 110, 120. For another example, the report daemon process may transmit the report over the private or public networks 110, 120 to the central repository system 310.

Referring back to FIGS. 3A–C, in accordance with one embodiment of the present invention, the capture report 345 may be provided to the capture analysis module 325 in the central repository system 310, which may analyze the capture report 345. The selected functions 340(1–5) in the CRAFT 326 depicted in FIG. 3B may, in one embodiment, be used by the capture analysis module 325 to analyze diagnostic information 315 associated with the error. For example, the capture analysis module 325 may use the similarity matching function 340(3) to determine a percent likelihood that the error is a member of a predetermined group of errors, such as those that may be stored in the group database 350. For another example, the capture analysis module 325 may use the repair function 340(4) to suggest possible methods of debugging the error, based upon the percent likelihood that the error is a member of a predetermined group of errors with a known solution, as described in more detail below. For another example, the analysis module may use the group operator function 340(5) to perform operations, such as associating the report with one of the predetermined error groups, creating a new group, and the like.

Figure 5:
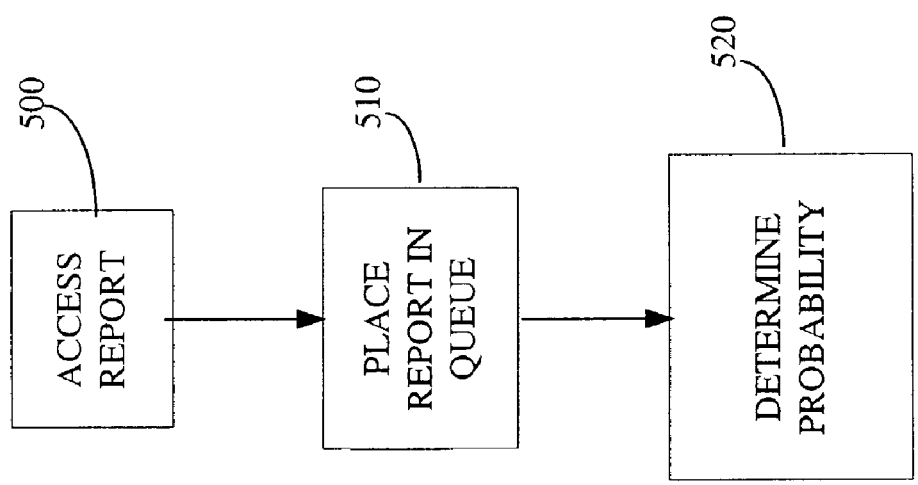
FIG. 5 shows a flow diagram of an exemplary method of receiving reports in the central repository system depicted in FIG. 3, in accordance with one embodiment of the present invention.

FIG. 5 shows a flow diagram of an exemplary method of receiving reports in the central repository system 310, in accordance with one embodiment of the present invention. The capture analysis module 325 may access (at 500) a report on one or more of the capture monitored systems 305, or any other desirable source. The report may then be placed (at 510) in a queue (not shown). The queue may, in one embodiment, contain a list of received reports that may be arranged in any desirable order. For example, reports may be arranged in the approximate order in which they are received by the central repository system 310.

Figure 6:
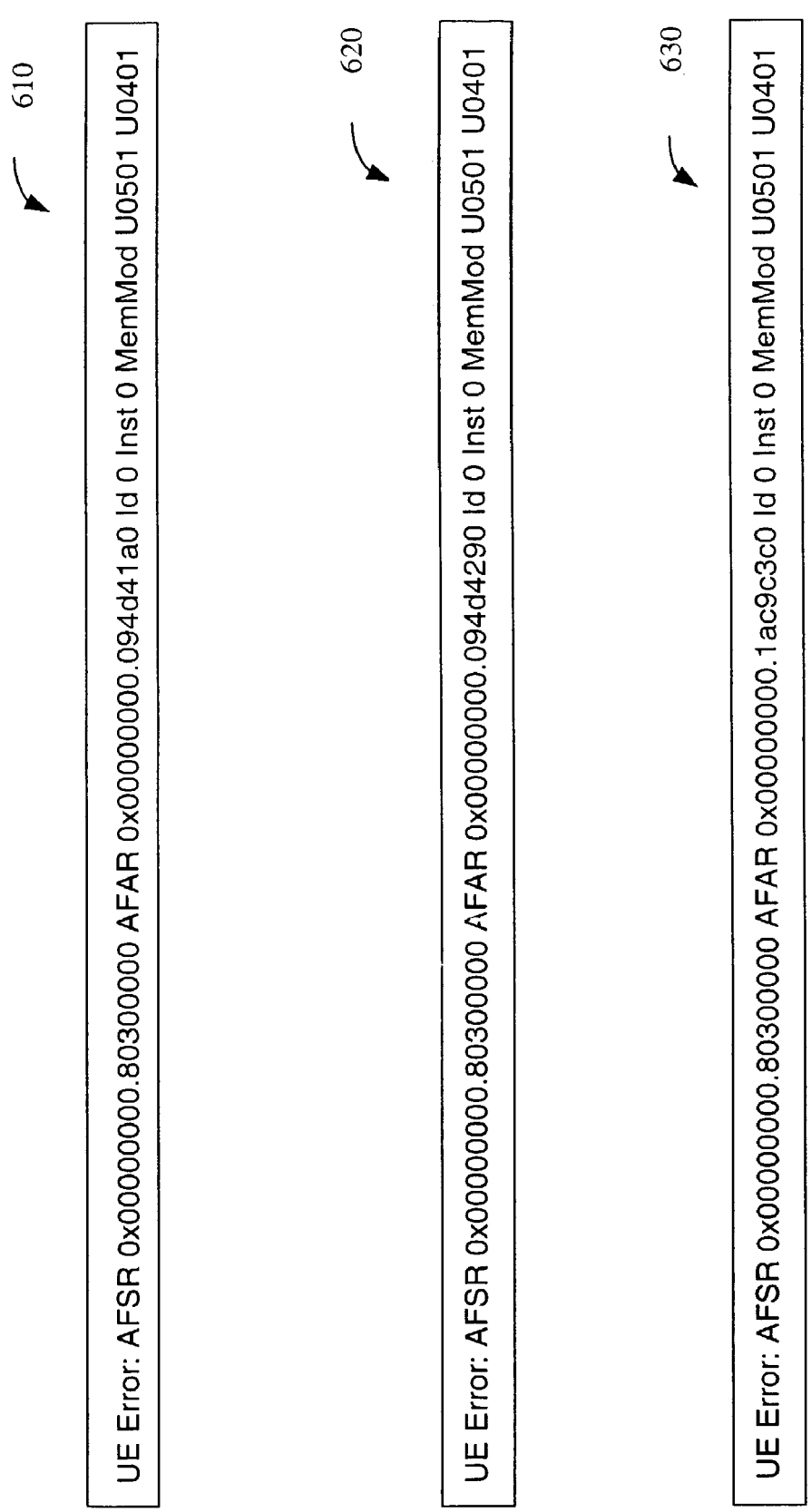
FIG. 6 shows exemplary panic strings that may be included in the reports received by the central repository system depicted in FIG. 3, in accordance with one embodiment of the present invention.

The capture analysis module 325 may also determine (at 520) a probability that the report may be similar to other reports included in the one or more predetermined error groups. In one embodiment, the capture analysis module 325 may determine (at 520) the probability by calculating a percent likelihood using the similarity matching function 340(3). For example, the capture analysis module 325 may compare a panic string 610, such as that shown in FIG. 6, to a first group panic string 620 that may be associated with a first stored report from a first group and a second group panic string 630 that may be associated with a second stored report from a second group. The capture analysis module 325 may determine that the report may be about 93.7% similar to the first stored report in the first group. The capture analysis module 325 may also determine that the report may be about 92.5% similar to the second stored report in the second group. Although, in the previous example, the capture analysis module 325 computed a percent likelihood using only one stored report from each group, the present invention is not so limited. In alternative embodiments, the capture analysis module 325 may determine (at 520) a plurality of probabilities for a plurality of stored reports in each group. The capture analysis module 325 is not constrained to determine (at 520) the probabilities using the panic string 610. In alternative embodiments, the capture analysis module 325 may determine (at 520) the probabilities using any desirable information.

Referring back to FIG. 5, although the steps of placing (at 510) the report in the queue and determining (at 520) the probability have been described as occurring sequentially, this is not an essential feature of the present invention. In alternative embodiments, the steps of placing (at 510) the report in the queue and determining (at 520) the probability may occur in any desirable order or substantially simultaneously.

Figure 7A:
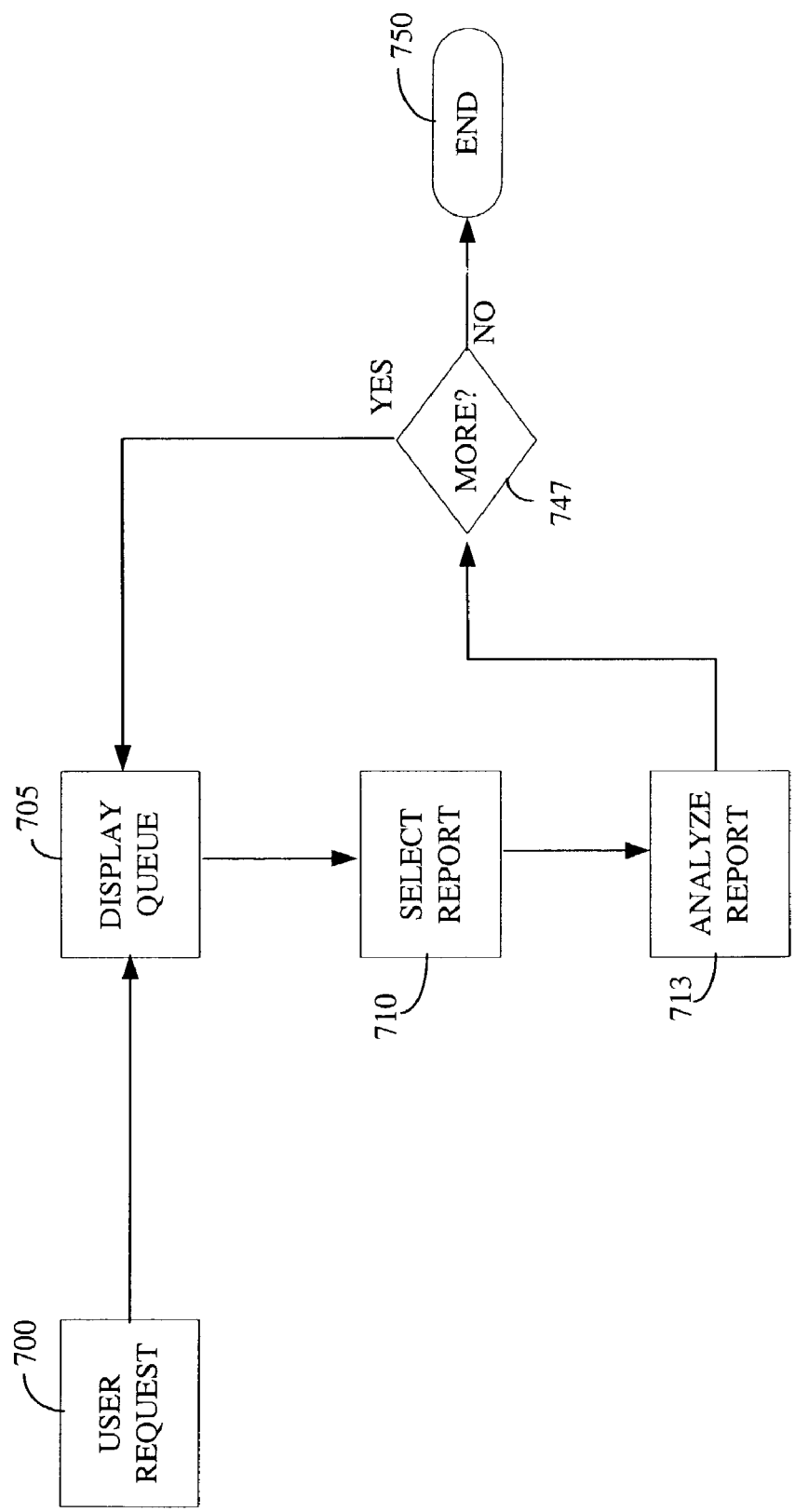
FIGS. 7A–B show flow diagrams of an exemplary method that may be used to analyze the received reports, in accordance with one embodiment of the present invention.

FIG. 7A shows a flow diagram of an exemplary method that may be used to analyze the received reports. A user may request (at 700) access to the queue of received reports. Upon receiving the request, the capture analysis module 325 may display (at 705) the queue. In one embodiment, displaying (at 705) the queue may include displaying a graphical user interface (GUI) on a monitor (e.g. the monitor 270 shown in FIG. 2). It should, however, be appreciated that the GUI is not an essential feature of the present invention and the queue described herein may be displayed in any desirable fashion. The GUI may also display (at 705) the probability that may have been determined for each of the received reports in the queue, as described above. The results may, in one embodiment, include a list of groups and a percent likelihood that the received error may be a member of that group. In one embodiment, the GUI may allow the user to select (at 710) one or more received reports and to analyze (at 713) the selected reports.

Figure 7B:
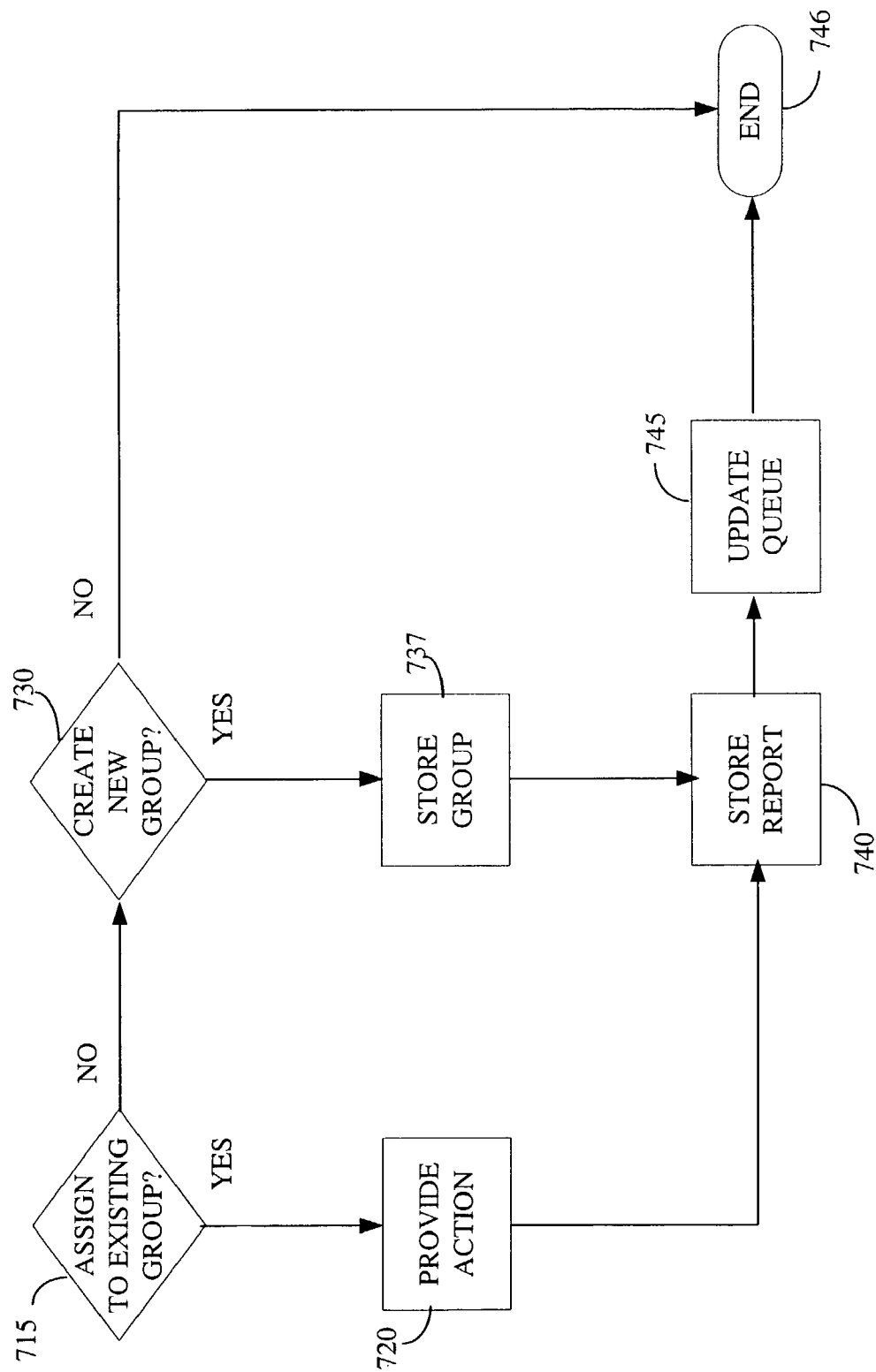

Referring now to FIG. 7B, a flow diagram illustrating an exemplary method of analyzing (at 713) the selected reports is shown. In one embodiment, the user may assign (at 715) the selected report to an existing group. For example, as described above, the capture analysis module 325 may determine that the panic string 610 of the selected report may be about 93.7% similar to the first group panic string 620 and 92.5% similar to the second group panic string 630. The user may thus assign (at 715) the selected report to the first group. However, it should be noted that the user is not constrained to assign (at 715) the selected report to the group with the largest percent likelihood. In the above example, the user could assign (at 715) the selected report to the second group.

If the user assigns (at 715) the error to an existing group, the capture analysis module 325 may provide (at 720) a suggested predetermined action. For example, previous reports may have been associated with errors that may have been corrected by rebooting one or more communication devices 125. Thus, the capture analysis module 325 may provide a message suggesting that one or more communication devices 125 be rebooted. The capture analysis module 325 may store (at 740) the report in the report database 360 and update (at 745) the queue. Although not so limited, in one embodiment, updating (at 745) the queue may include such tasks as removing the report from the queue, sorting the remaining reports, and the like. The capture analysis module 325 may then end (at 746) the analysis. Referring back to FIG. 7A, the user may then choose (at 747) to analyze another report and, again, display the queue (at 705) and continue the analysis . If not, the capture analysis module 325 may then end (at 750) the analysis.

As shown in FIG. 7B, the user may alternatively choose not to assign (at 715) the error to an existing group. In one embodiment, the capture analysis module 325 may allow the user to create (at 730) a new group. Although not so limited, creating (at 730) a new group may include such tasks as assigning a group number, allocating storage space for the group, and the like The capture analysis module 325 may also store (at 737) the group in the group database 350. The capture analysis module 325 may also store (at 740) the report in the report database 360 and update (at 745) the queue. Although not so limited, in one embodiment, updating (at 745) the queue may include such tasks as removing the report from the queue, sorting the remaining reports, and the like. The capture analysis module 325 may then end (at 746) the analysis. Referring back to FIG. 7A, the user may then choose (at 747) to analyze another report and, again, display the queue (at 705) and continue the analysis. If not, the capture analysis module 325 may then end (at 750) the analysis.

As a more specific example, an engineering team may, using one or more embodiments of the present invention, test an upgrade of an operating system before shipping the operating system. That is, the engineering team may first install the operating system on one or more capture monitored systems 305. The capture monitored systems 305 may comprise a variety of systems, including personal computers manufactured by a variety of different vendors. The capture monitored systems 305 may then be continuously operated with a variety of applications operating therein. Over time, errors may occur as the operating system interacts with the various hardware and software components of the capture monitored systems 305. The report module 320 may categorize these errors, which may reveal one or more shortcomings in the operating system under test. For example, an error may cause the operating system to repeatedly crash when a particular software application performs a specific task on a certain vendor's personal computer. The engineering team may use this information to identify and repair the error before shipping the upgraded version of the operating system. Furthermore, the engineering team may use this information to form one or more groups that may be used to identify and repair errors that may occur after the upgraded version has been shipped.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   accessing a report generated in response to an error;
   accessing at least one stored report associated with a predetermined error group; and
   determining a probability that the error is associated with the predetermined error group.

2. The method of claim 1, wherein accessing the at least one stored report associated with the predetermined error group comprises accessing at least one stored error attribute string included in the at least one stored report associated with the predetermined error group.

3. The method of claim 2, wherein determining a probability that the error is associated with the predetermined error group comprises determining a probability that the error is associated with the predetermined error group using the stored error attribute string.

4. The method of claim 3, wherein using the stored error attribute string comprises comparing the stored error attribute string to at least one error attribute string included in the report.

5. The method of claim 4, wherein comparing the stored error attribute string to the error attribute string included in the report comprises determining a percent likelihood that the error attribute string included in the report is substantially the same as the stored error attribute string.

6. The method of claim 5, wherein determining the percent likelihood comprises determining the percent likelihood using a similarity matching function.

7. The method of claim 6, further comprising providing the percent likelihoods to a user.

8. The method of claim 7, wherein providing the percent likelihood comprises providing the percent likelihood via a graphical user interface (GUI).

9. The method of claim 1, further comprising associating the report with at least one error group.

10. The method of claim 9, wherein associating the report with at least one error group comprises associating the report with the predetermined error group.

11. The method of claim 10, wherein associating the report with at least one error group comprises allowing the user to associate the report with the predetermined error group.

12. The method of claim 9, wherein associating the report with at least one error group comprises creating a new error group.

13. The method of claim 12, wherein creating the new error group comprises assigning an identifier to the new error group.

14. The method of claim 13, wherein creating the new error group comprises allocating memory to the new error group.

15. The method of claim 14, wherein creating a new error group comprises allowing the user to create a new error group.

16. The method of claim 1, further comprising providing a suggested corrective action associated with the predetermined error group to correct the error.

17. A method, comprising:
receiving a report generated in response to an error;
accessing at least one string in the report;
accessing at least one stored string in at least one report stored in a database, wherein the stored report is associated with at least one predetermined error group;
determining a probability that the string accessed in the report is substantially the same as the stored string; and
associating the report with an error group using the determined probability.

18. The method of claim 17, wherein accessing the string comprises accessing an error attribute string.

19. The method of claim 17, wherein determining a probability that the string is substantially the same as the stored string comprises determining a percent likelihood that the string is substantially the same as the stored string using a similarity matching function.

20. The method of claim 17, wherein associating the report with at least one error group comprises associating the report with at least one of the predetermined error groups.

21. The method of claim 20, wherein associating the report with at least one of the predetermined error groups comprises storing the report in the database.

22. The method of claim 17, wherein associating the report with at least one error group comprises creating a new error group.

23. The method of claim 22, wherein creating the new error group comprises storing the new error group in the database.

24. A computer readable storage medium comprising program instructions that when executed enable a processor to:
access at least one string in a report generated in response to an error;
access at least one stored string in at least one report stored in a database, wherein the stored report is associated with at least one predetermined error group;
determine a probability that the string is substantially the same as the at least one stored string; and
provide the determined probability to a user.

25. The computer readable storage medium of claim 24, wherein the instructions when executed enable the processor to determine the probability using a similarity matching function.

26. The computer readable storage medium of claim 24, wherein the instructions when executed enable the processor to provide the determined probability to the user via a graphical user interface (GUI).

27. The computer readable storage medium of claim 24, wherein the instructions when executed further enable the processor to associate the report with at least one predetermined error group.

28. The computer readable storage medium of claim 24, wherein the instructions when executed further enable the processor to create a new error group.

29. The computer readable storage medium of claim 28, wherein the instructions when executed further enable the processor to associate the report with the new error group.

30. An apparatus, comprising:
a bus; and
a processor coupled to the bus, wherein the processor is adapted to receive a report generated in response to an error, access at least one string in the report and at least one stored string in at least one report stored in a database, determine a probability that the string is substantially the same as the stored string, and associate the report with an error group using the determined probability.

31. An apparatus, comprising:
means for accessing a report generated in response to an error;
means for accessing at least one predetermined error group; and
means for determining a probability that the error is associated with the predetermined error group.

32. An apparatus, comprising:
means for receiving a report generated in response to an error;
means for accessing at least one string in the report;
means for accessing at least one stored string in at least one report stored in a database, wherein the stored report is associated with at least one predetermined error group;
means for determining a probability that the string accessed in the report is substantially the same as the stored string; and
means for associating the report with an error group using the determined probability.

* * * * *